United States Patent
Molander et al.

(10) Patent No.: US 7,506,258 B1
(45) Date of Patent: Mar. 17, 2009

(54) METHOD AND SYSTEM OF INTEGRATING OUT-OF-VIEW AND TOPOLOGY OVERVIEW INFORMATION WITH PRIMARY VIEW, USING WITHIN-FRAME CONTROLS AND VISUAL INDICATORS

(75) Inventors: Mark E. Molander, Cary, NC (US); Kerry A. Ortega, Raleigh, NC (US); Thomas Brugler, Fuquay-Varina, NC (US); Todd Michael Eischeid, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/020,527

(22) Filed: Jan. 26, 2008

(51) Int. Cl.
*G06F 15/177* (2006.01)

(52) U.S. Cl. .................. 715/734; 709/223; 709/250; 715/711

(58) Field of Classification Search ................. 715/734, 715/711; 709/223, 250
See application file for complete search history.

(56) References Cited

U.S. PATENT DOCUMENTS

| | | | |
|---|---|---|---|
| 6,040,834 A | 3/2000 | Jain et al. | |
| 7,072,986 B2 | 7/2006 | Kitamura et al. | |
| 2004/0215649 A1 | 10/2004 | Whalen et al. | |
| 2005/0076312 A1* | 4/2005 | Gardner et al. | 715/853 |
| 2005/0132305 A1* | 6/2005 | Guichard et al. | 715/855 |
| 2005/0283728 A1* | 12/2005 | Pfahlmann et al. | 715/711 |
| 2007/0097883 A1 | 5/2007 | Liu et al. | |
| 2007/0208840 A1 | 9/2007 | McConville et al. | |
| 2007/0245261 A1 | 10/2007 | Bukovec et al. | |

OTHER PUBLICATIONS

Catherine Plaisant et al.; Space Tree: Supporting Exploration in Large Node Link Tree, Design Evolution and Empirical Evaluation; 2002; IEEE Symposium on Information Visualization; InfoVis'02; pp. 2-3.*

* cited by examiner

*Primary Examiner*—William Bashore
*Assistant Examiner*—Phenuel S Salomon
(74) *Attorney, Agent, or Firm*—MaxValueIP, LLC

(57) ABSTRACT

A new network topology visualization integrates out-of-view and topology overview information into the navigational frame bars of the primary topology view to save screen space and make the associated information more tightly bound to the working view area. This way, the user does not need to go back and forth between two disconnected and distinct view areas, and more screen space will be available for conveying useful information.

1 Claim, 3 Drawing Sheets

METHOD AND SYSTEM OF INTEGRATING OUT-OF-VIEW AND TOPOLOGY OVERVIEW INFORMATION WITH PRIMARY VIEW, USING WITHIN-FRAME CONTROLS AND VISUAL INDICATORS

BACKGROUND OF THE INVENTION

One of the embodiments of this invention is related to User Interactive/Interface (UI) Technology or Network Computing. Computer networking is the engineering discipline concerned with communication between computer systems or devices.

Network topology is the study of the arrangement or mapping of the elements (links, nodes, etc.) of a network, especially the physical and logical interconnections between nodes.

A local area network (LAN) is one example of a network that exhibits both a physical topology and a logical topology. Any given node in the LAN will have one or more links to one or more other nodes in the network, and the mapping of these links and nodes onto a graph results in a geometrical shape that determines the physical topology of the network. Likewise, the mapping of the flow of data between the nodes in the network determines the logical topology of the network. It is important to note that the physical and logical topologies might be identical in any particular network but they also may be different.

Topology UI views have navigation issues when they do not scale nicely within one view. This problem often happens when there are more than a few dozen nodes. To help with this problem, a broader secondary overview topology UI is frequently shown adjacent to the primary display area to compensate for this. However, this solution is less than ideal and not very seamless, since the broader view itself takes up another screen area, and it's not directly part of the primary view, i.e., it is off to the side in basically another dedicated view area taking up an area removed from the primary view area.

SUMMARY OF THE INVENTION

One of the embodiments of this invention relates generally to a Network Topology and more particularly out-of-view and topology overview information. An embodiment of invention integrates out-of-view and topology overview information into the navigational frame bars of the primary topology view to save screen space and make the associated information more tightly bound to the working view area. This way, the user does not need to go back and forth between two disconnected and distinct view areas, and more screen space will be available for conveying useful information.

DETAILED DESCRIPTION OF THE PREFERRED EMBODIMENTS

In one embodiment, the view's frame bars incorporate visual cues such as shading to indicate the number of nodes in each direction. If most of the nodes are to the left, the left-side navigational frame bar becomes the darkest. If there is one node to the right, the right bar is very light; and if there are no nodes toward top or bottom, those corresponding bars have no shading. Additionally, numeric indicators can be used to provide more details and enhance the graphic shading information.

In one embodiment, additional information could also be added about the type and number of off-the-view elements.

In one embodiment, when the user hovers the mouse pointer on the border/bar/frame of the view area a mouse-over overview is displayed. The fly-over overview can also be pointer-sensitive, so clicking on it would reorient the primary topology view based on the click.

In another embodiment, when the user mouse is over one of the status indicators on the frame border, those items with that status are highlighted in the overview window.

Another embodiment provides a broad set of user interactions with the fly-over invoked and contextual overview area. The typically ephemeral overview area could be temporarily kept open by a user interaction, such as with mouse or a key interaction (e.g., alt+click). Then, the user could use the overview area to do more advanced operations, e.g., quickly navigating and repositioning the main view frame. For instance, the user could click in the overview area to re-center the main view frame based on click position, multi select (Ctrl+Click) multiple nodes to re-center and emphasize those selections in the navigation, swipe select within the overview area to resize and reorient the navigation, or click on a node within the overview to quickly drill down to its properties (bypassing another topology view). Node names and more details can be available on fly-over within the overview area. The user could also drag an overview item into a new view to focus on that item and what's directly connected to it.

Figure 1:
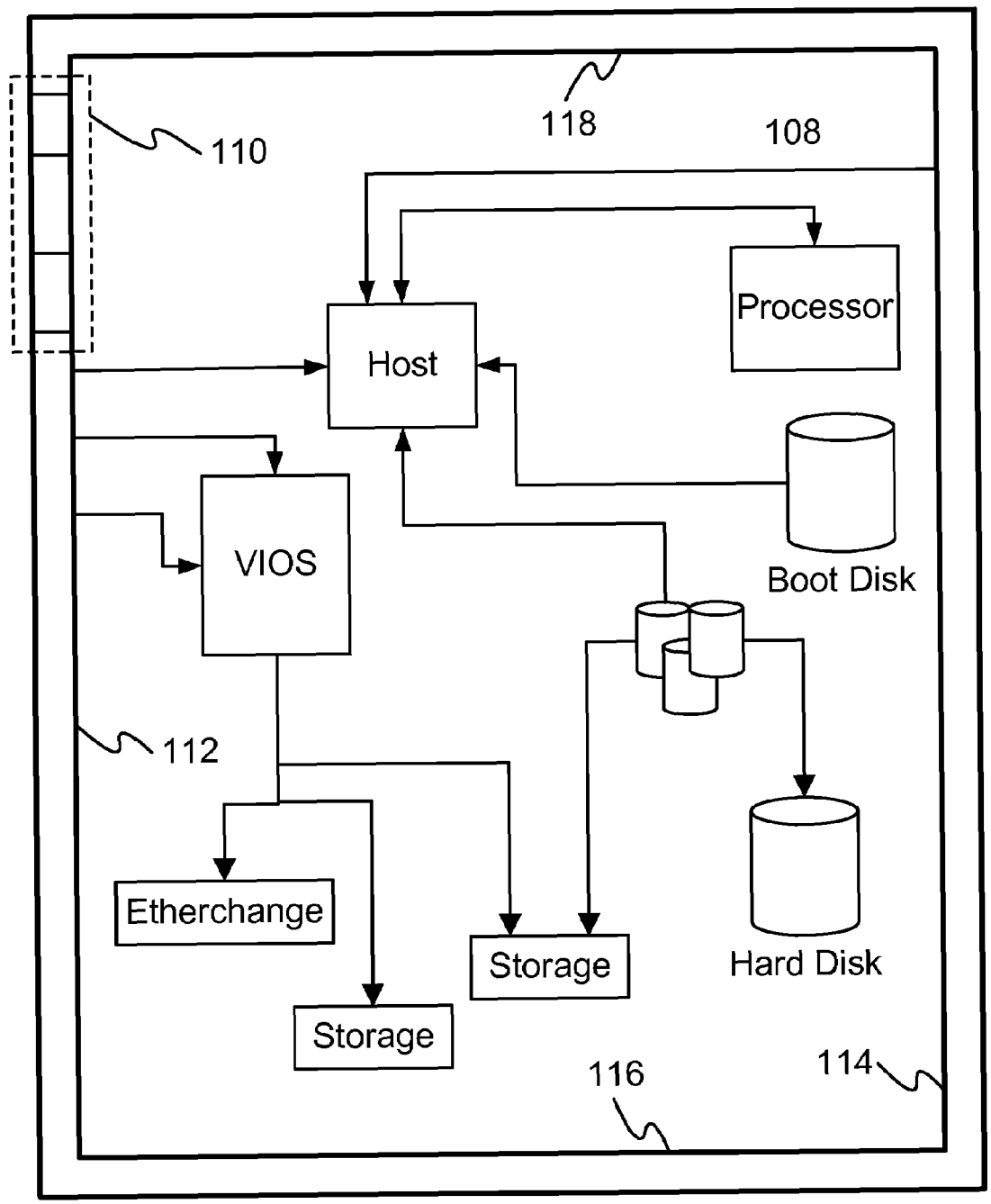
FIG. 1 is a schematic diagram of a network topology with frame area information indicators.

Referring to the drawings, FIG. 1 is a schematic diagram of the network topology visualization in a computer system (108) which is configured to have a plurality of hosts and nodes and the interaction may be provided through a graphical user interface.

The view's frame bars incorporate visual cues such as shading to indicate the number of nodes in each direction. FIG. 1 shows most of the nodes to the left, so the left-side navigational frame bar is darkest (112). Having one node to the right, the right bar is very light (114), and having no nodes above or below, those bars have no shading (116 and 118). Additional indicators can be used to provide more details and enhance the graphic shading information (110). Examples of such indicators are shown in FIG. 2.

Figure 2:
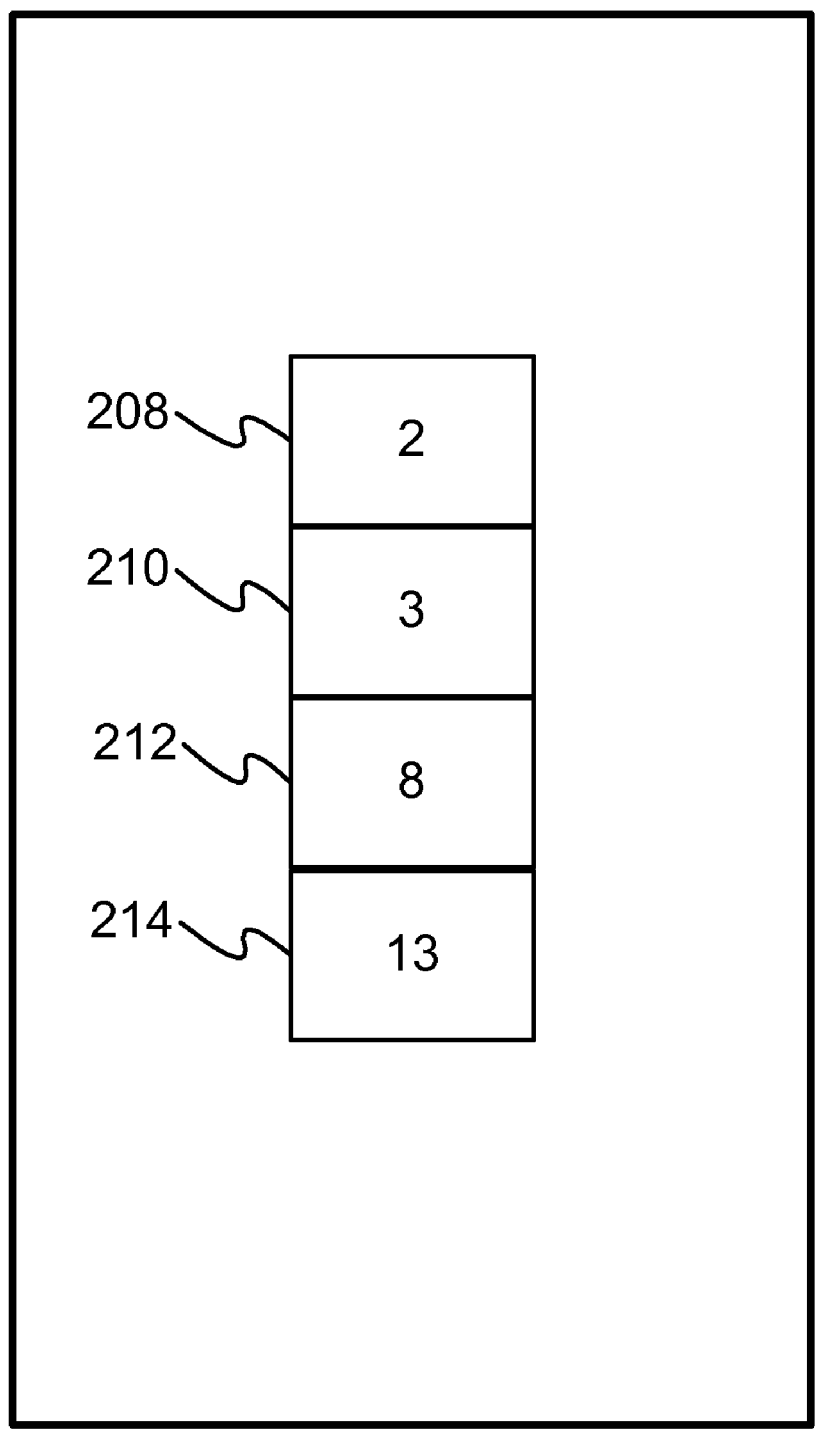
FIG. 2 is a schematic diagram of a close up of frame area of topology view area.

FIG. 2 is a schematic diagram of the close up of frame area of topology view area. In one embodiment, the additional information could also be added about the type and number of off-the-view elements. In FIG. 2, the types of nodes have been indicated for each direction using visual indicators such as color and numbers. For example, there are four types of node conditions in the diagram: cyan with 2 nodes (208), grey with 3 nodes (210), yellow with 8 nodes (212); and the total of 13 nodes (214) exist to the left of the topology view area.

In the area shown in FIG. 2 (close-up), other status conditions for the left side items can be displayed with numbers indicating how many items have a given status condition. These status indicators could also be controls which cause reorienting and optimizing the primary view to show the objects with the same status.

Figure 3:
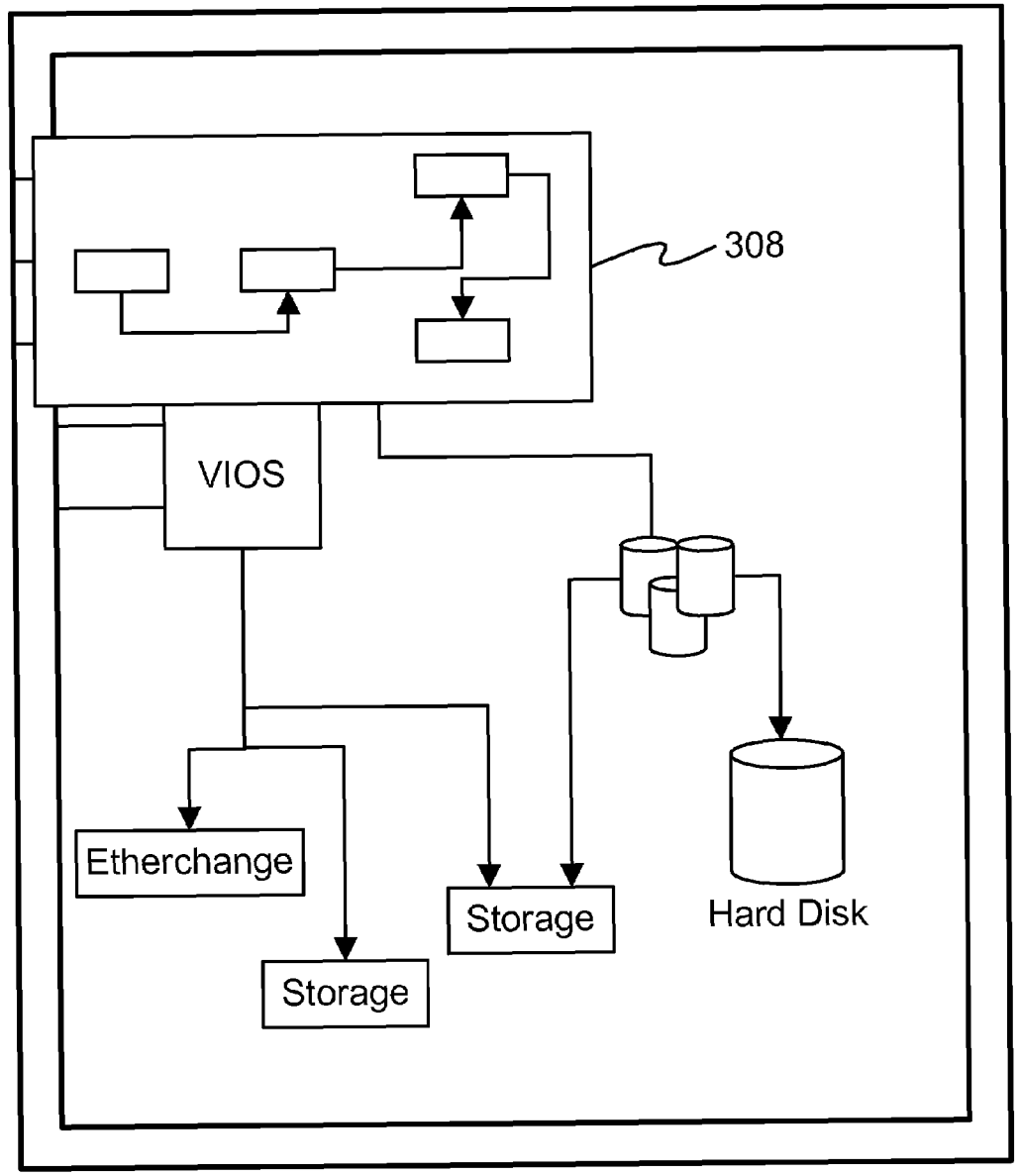
FIG. 3 is a schematic diagram of the in-context fly-over directional overview.

FIG. 3 is a schematic diagram of the in-context fly-over directional overview. In one embodiment, in a given operation, when the user moves the mouse pointer over the border/bar/frame of the view area (a mouse-over overview), the overview window is displayed (308). The fly-over overview can also be pointer-sensitive. So, clicking on the fly-over overview would reorient the primary topology view based on the click.

In another embodiment, when the user mouse is over one of the status indicators on the frame border, those items having that status are highlighted within the overview window (308).

An embodiment of the invention is a method of integrating out-of-view information and topology overview information with primary view, using within-frame controls and visual indicators, for a user-interface display.

This method displays a primary working view area and stores the out-of-view information which has hidden information.

The method also displays topology and structure of files or objects in the primary working view area, and it describes the relationship between the files or objects, in context, using the topology and structure of files or objects.

The method incorporates navigational controls and visual indicators into a frame of the primary working view area. The navigational controls and visual indicators comprise:

- shading indicators that indicate concentration or number of nodes for the topology and structure of files or objects for the hidden information in each direction,
- direction controls to left, right, top, bottom, top right, top left, bottom right, and bottom left,
- counters related to the hidden information associated with the direction controls or each direction,
- color indicators indicating type of the nodes for the hidden information associated with the direction controls or each direction,
- status indicators indicating status of the nodes,
- additional controls for reorienting, re-centering, resizing, and optimizing the primary working view area, and
- grouping tools for grouping the nodes which have the same status or similar function.

Upon hovering a mouse or pointer device over the frame of the primary working view area, the method displays a small window over the primary working view area that is click-sensitive with respect to the mouse or pointer device; displays or highlights additional information or nodes, temporarily keeps the small window open, and displays the properties of the small window and nodes associated with the small window.

A system, apparatus, or device comprising one of the following items is an example of the invention: user interface, GUI, interactive device, input device, topology chart or tree structure, computer display, windows, menu, controller, indicator, server, client device, PDA, mobile device, cell phone, storage to store the topology information, router, switches, network, communication media, cables, fiber optics, physical layer, buffer, nodes, packet switches, computer monitor, or any display device, applying the method mentioned above, for purpose of user interface, data presentation, navigation, display on computer monitor, or display control. Any variations of the above teaching are also intended to be covered by this patent application.

The invention claimed is:

1. Method of integrating out-of-view information and topology overview information with primary view, using within-frame controls and visual indicators, for a user-interface display, said method comprising:
   - displaying a primary working view area;
   - storing said out-of-view information;
   - wherein said out-of-view information comprising hidden information;
   - said primary working view area displaying topology and structure of files or objects;
   - said topology and structure of files or objects describing the relationship between said files or objects, in context;
   - incorporating navigational controls and visual indicators into a frame of said primary working view area;
   - said navigational controls and visual indicators comprising: direction controls to left, right, top, bottom, top right, top left, bottom right, and bottom left, shading indicators that indicate concentration or number of nodes for the topology and structure of files or objects for the hidden information in each said direction, counters related to said hidden information associated with the direction controls or each said direction, color indicators indicating type of the nodes for the hidden information associated with the direction controls or each said direction, status indicators indicating status of the nodes, additional controls for reorienting, re-centering, resizing, and optimizing the primary working view area, and grouping tools for grouping the nodes which have the same status or similar function; and
   - upon hovering a mouse or pointer device over the frame of the primary working view area, the method displays a small window over the primary working view area that is click-sensitive with respect to the mouse or pointer device; displays or highlights additional information or nodes, temporarily keeps the small window open, and displays the properties of the small window and nodes associated with the small window.

* * * * *